US012386306B2

(12) United States Patent
Hatano

(10) Patent No.: US 12,386,306 B2
(45) Date of Patent: *Aug. 12, 2025

(54) TRANSFER BELT UNIT AND IMAGE FORMING APPARATUS

(71) Applicant: BROTHER KOGYO KABUSHIKI KAISHA, Nagoya (JP)

(72) Inventor: Shuhei Hatano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 7 days.

This patent is subject to a terminal disclaimer.

(21) Appl. No.: 18/486,456

(22) Filed: Oct. 13, 2023

(65) Prior Publication Data

US 2024/0160144 A1 May 16, 2024

Related U.S. Application Data

(63) Continuation of application No. 17/391,102, filed on Aug. 2, 2021, now Pat. No. 11,829,097, which is a (Continued)

(30) Foreign Application Priority Data

Sep. 28, 2018 (JP) ................................ 2018-184031

(51) Int. Cl.
*G03G 21/16* (2006.01)
*G03G 15/16* (2006.01)

(52) U.S. Cl.
CPC ....... *G03G 21/1652* (2013.01); *G03G 15/161* (2013.01); *G03G 21/168* (2013.01)

(58) Field of Classification Search
CPC . G03G 21/168; G03G 21/1652; G03G 15/161
See application file for complete search history.

(56) References Cited

U.S. PATENT DOCUMENTS 6,198,897 B1 3/2001 Ream
6,363,228 B1 3/2002 Ream
(Continued)

FOREIGN PATENT DOCUMENTS

CN 2762189 Y 3/2006
CN 101075119 A 11/2007
(Continued)

OTHER PUBLICATIONS

Office Action issued in corresponding Japanese Patent Application No. 2018-184031, Oct. 10, 2023.
(Continued)

*Primary Examiner* — Stephanie E Bloss
*Assistant Examiner* — Michael A Harrison
(74) *Attorney, Agent, or Firm* — Merchant & Gould P.C.

(57) ABSTRACT

A transfer belt unit mountable to and demountable from an apparatus main body of an image forming apparatus, the transfer belt unit including: a transfer belt being in contact with a photosensitive drum of a drum cartridge of the image forming apparatus in a state where the transfer belt unit is mounted to the apparatus main body, the transfer belt being configured to transfer a toner image on the photosensitive drum to a sheet conveyed between the photosensitive drum and the transfer belt and to convey the sheet conveyed between the photosensitive drum and the transfer belt toward a fixing unit of the image forming apparatus in the state where the transfer belt unit is mounted to the apparatus main body, and a belt memory in which information about the transfer belt unit is stored.

16 Claims, 9 Drawing Sheets

Related U.S. Application Data continuation of application No. 16/584,254, filed on Sep. 26, 2019, now Pat. No. 11,079,715.

(56) References Cited

U.S. PATENT DOCUMENTS

| | | | | |
|---|---|---|---|---|
| 11,829,097 | B2 * | 11/2023 | Hatano | G03G 15/161 |
| 2004/0057737 | A1 | 3/2004 | Yokono | |
| 2004/0109704 | A1 | 6/2004 | Abe | |
| 2005/0008406 | A1 * | 1/2005 | Nishizaki | G03G 15/0131 399/301 |
| 2007/0058992 | A1 | 3/2007 | Suzuki et al. | |
| 2007/0177894 | A1 | 8/2007 | Nakano et al. | |
| 2007/0286651 | A1 | 12/2007 | Takuwa | |
| 2008/0240750 | A1 | 10/2008 | Hanamoto et al. | |
| 2009/0285594 | A1 | 11/2009 | Kichise et al. | |
| 2011/0052275 | A1 | 3/2011 | Masumoto | |
| 2011/0274457 | A1 | 11/2011 | Makino | |
| 2012/0134727 | A1 | 5/2012 | Yamaguchi et al. | |
| 2015/0037059 | A1 | 2/2015 | Yang et al. | |
| 2015/0055963 | A1 | 2/2015 | Kanno et al. | |
| 2016/0161904 | A1 | 6/2016 | Matsuda et al. | |
| 2017/0090355 | A1 | 3/2017 | Onishi | |
| 2018/0150017 | A1 | 5/2018 | Matsuda et al. | |

FOREIGN PATENT DOCUMENTS

| | | | |
|---|---|---|---|
| CN | 106950808 | A | 7/2017 |
| JP | 9-179474 | A | 7/1997 |
| JP | 10-187002 | A | 7/1998 |
| JP | 11-344875 | A | 12/1999 |
| JP | 2003-223058 | A | 8/2003 |
| JP | 2003-307975 | A | 10/2003 |
| JP | 2004-109880 | A | 4/2004 |
| JP | 2005-91394 | A | 4/2005 |
| JP | 2007-010839 | A | 1/2007 |
| JP | 2007-102137 | A | 4/2007 |
| JP | 2010-2679 | A | 1/2010 |
| JP | 2011-70166 | A | 4/2011 |
| JP | 2012-118175 | A | 6/2012 |
| JP | 2012-238027 | A | 12/2012 |
| JP | 2013-210553 | A | 10/2013 |
| JP | 2015-62053 | A | 4/2015 |
| JP | 2016-110105 | A | 6/2016 |
| JP | 2018-005065 | A | 1/2018 |

OTHER PUBLICATIONS

JP_11344875_A-T Machine Translation, Ito et al., Japan, Dec. 1999 (in parent application).

Office Action issued in corresponding Chinese Patent Application No. 201910931164.9, Jan. 28, 2022.

Notice of Reasons for Refusal issued in corresponding Japanese Patent Application No. 2018-184031, mailed Jun. 21, 2022.

Second Office Action issued in corresponding Chinese Patent Application No. 201910931164.9, mailed Aug. 15, 2022.

Office Action (Decision of Refusal) issued in corresponding Japanese Patent Application No. 2018-184031, Oct. 4, 2022.

JP_11344875_A_I Machine Translation, Japan, Ito, 1999, in parent application.

Office Action issued in corresponding Chinese Patent Application No. 201910931164.9, Mar. 3, 2023.

* cited by examiner

TRANSFER BELT UNIT AND IMAGE FORMING APPARATUS

CROSS-REFERENCE TO RELATED APPLICATIONS

This application is a continuation of U.S. patent application Ser. No. 17/391,102, filed Aug. 2, 2021, now U.S. Pat. No. 11,829,097, which is a continuation of U.S. patent application Ser. No. 16/584,254, filed Sep. 26, 2019, now U.S. Pat. No. 11,079,715, which is based upon and claims the benefit of priority from prior Japanese patent application No. 2018-184031, filed on Sep. 28, 2018, the entire contents of which are incorporated herein by reference.

TECHNICAL FIELD

The present disclosure relates to a transfer belt unit and an image forming apparatus including the transfer belt unit.

BACKGROUND ART

In the related art, an image forming apparatus including a detachable transfer belt unit has been known. The transfer belt unit is configured to transfer a toner image on a photosensitive drum to a sheet and to convey the sheet between the transfer belt unit and the photosensitive drum.

In order to perform an optimal image processing in correspondence to an exchanged transfer belt unit, it is needed to obtain information about the transfer belt unit.

SUMMARY

An aspect of the present disclosure provides a transfer belt unit storing information about a detachable transfer belt unit.

Another aspect of the present disclosure provides an image forming apparatus including a transfer belt unit storing information about a detachable transfer belt unit.

According to an aspect of the present disclosure, there is provided a transfer belt unit mountable to and demountable from an apparatus main body of an image forming apparatus, the transfer belt unit including: a transfer belt being in contact with a photosensitive drum of a drum cartridge of the image forming apparatus in a state where the transfer belt unit is mounted to the apparatus main body, the transfer belt being configured to transfer a toner image on the photosensitive drum to a sheet conveyed between the photosensitive drum and the transfer belt and to convey the sheet conveyed between the photosensitive drum and the transfer belt toward a fixing unit of the image forming apparatus in the state where the transfer belt unit is mounted to the apparatus main body, and a belt memory in which information about the transfer belt unit is stored.

DESCRIPTION OF EMBODIMENTS

Figure 1:
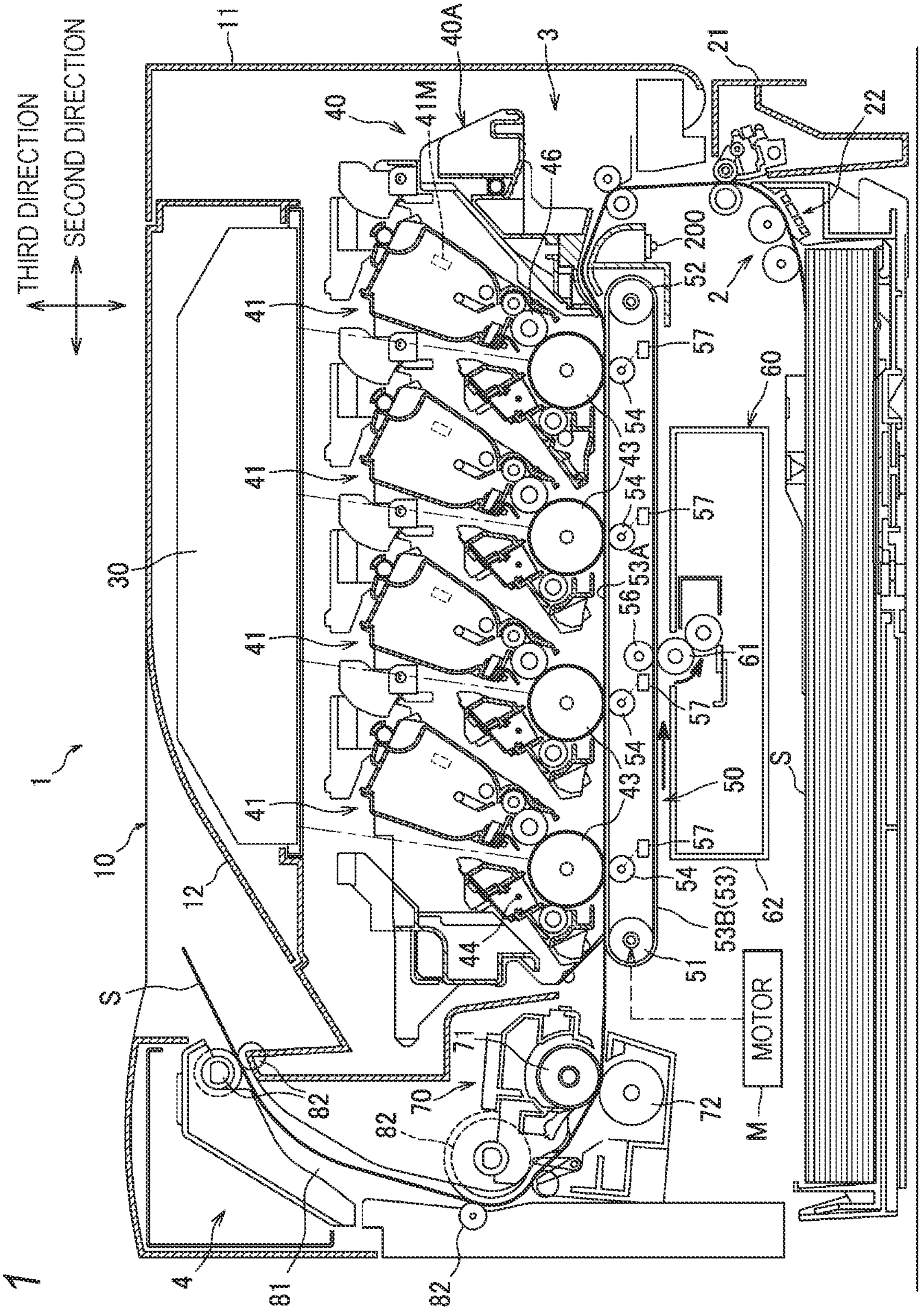
FIG. 1 depicts a schematic configuration of an image forming apparatus in accordance with an exemplary embodiment of the present disclosure.

Hereinafter, an exemplary embodiment of the present disclosure will be described in detail with reference to the drawings. Meanwhile, in the following descriptions, an axial direction of a photosensitive drum 41 is referred to as 'first direction'. Also, a direction in which a plurality of photosensitive drums 41 is aligned is referred to as 'second direction'. The second direction intersects with the first direction. Preferably, the second direction is perpendicular to the first direction. Also, a direction in which a discharge tray 12, an image forming part 3 and a sheet tray 21 are aligned is referred to as 'third direction'. The third direction intersects with the first direction and the second direction. Preferably, the third direction is perpendicular to the first direction and the second direction. In the exemplary embodiment, the third direction is a vertical direction.

As shown in FIG. 1, an image forming apparatus 1 is a color laser printer, for example. The image forming apparatus 1 includes an apparatus main body 10, a feeder unit 2 configured to feed a sheet S, an image forming part 3 configured to form an image on the fed sheet S, and a discharge unit 4 configured to discharge the sheet S having the image formed thereon.

The feeder unit 2 is located at a lower part in the apparatus main body 10, and includes a feeding tray 21 configured to accommodate therein sheets S, and a feeding mechanism 22 configured to feed the sheet S from the feeding tray 21 to the image forming part 3. The sheets S in the feeding tray 21 are separated one by one by the feeding mechanism 22, which is then fed to the image forming part 3.

The image forming part 3 includes an exposure unit 30, an image forming unit 40, a transfer belt unit 50, a belt cleaner 60, and a fixing unit 70.

The exposure unit 30 is located at an upper part in the apparatus main body 10, and includes a laser light-emitting part, a polygon mirror, a lens and a reflector, which are not shown.

The image forming unit 40 includes a drum cartridge 40A mountable to and demountable from the apparatus main body 10 and four developing cartridges 41 mountable to and demountable from the drum cartridge 40A. In a state where the drum cartridge 40A is mounted to the apparatus main body 10, the drum cartridge 40A is located between the feeder unit 2 and the exposure unit 30. The drum cartridge 40A is movable between a mounting position (refer to FIG. 1) inside the apparatus main body 10 and a separation position outside the apparatus main body 10.

The drum cartridge 40A includes four photosensitive drums 43 and four chargers 44. The developing cartridge 41 includes a developing roller 46. The developing cartridge 41 also includes a supply roller, a layer thickness regulation blade, and a toner accommodation part whose reference numerals are omitted.

The transfer belt unit 50 is mountable to and demountable from the apparatus main body 10. In a state where the transfer belt unit 50 is mounted to the apparatus main body 10, the transfer belt unit 50 is arranged between the feeder unit 2 and the image forming unit 40. The transfer belt unit

50 includes a drive roller 51, a driven roller 52, a transfer belt 53, four transfer rollers 54, four belt electrodes 57, and a backup roller 56.

The drive roller 51 is a roller configured to drive the transfer belt 53. The drive roller 51 is in contact with an inner surface of the transfer belt 53. A drive force that is generated from a motor M of the image forming apparatus 1 is transmitted to the drive roller 51, so that the transfer belt 53 is rotated in an arrow direction (counterclockwise direction) in FIG. 1.

The driven roller 52 is a roller configured to rotate in association with driving of the transfer belt 53. The driven roller 52 is in contact with the inner surface of the transfer belt 53.

The transfer belt 53 (including upper surface 53A) is in contact with the photosensitive drums 43 in the state where the transfer belt unit 50 is mounted to the apparatus main body 10. The transfer belt 53 is configured to transfer toner images on the photosensitive drums 43 to the sheet S conveyed between the photosensitive drums 43 and the transfer belt 53, and to convey the sheet S conveyed between the photosensitive drums 43 and the transfer belt 53 toward the fixing unit 70. The transfer belt 53 is an endless belt.

The transfer roller 54 is in contact with the inner surface of the transfer belt 53. The transfer roller 54 is a roller configured to sandwich the transfer belt 53 between the transfer roller 54 and each photosensitive drum 43. The belt electrode 57 is located at an end portion of the transfer roller 54 at another end-side in the first direction. The belt electrode 57 is an electrode electrically connected to the transfer belt 53 via the transfer roller 54. The belt electrode 57 is configured to apply a transfer bias to the transfer roller 54 so as to transfer the toner image on the photosensitive drum 43 to the sheet S in the state where the sheet S is conveyed between the photosensitive drum 43 and the transfer belt 53.

The belt cleaner 60 is located below the transfer belt unit 50. The belt cleaner 60 includes a cleaning roller 61 and a collection box 62. The cleaning roller 61 is in contact with a lower surface 53B of the transfer belt 53. The cleaning roller 61 is configured to collect toner on the transfer belt 53 and to accommodate the same in the collection box 62. The cleaning roller 61 is configured to sandwich the transfer belt 53 between the cleaning roller 61 and the backup roller 56.

The fixing unit 70 is located downstream of the image forming unit 40 and the transfer belt unit 50 with respect to a conveying direction. The fixing unit 70 includes a heating roller 71 and a pressing roller 72 arranged to face the heating roller 71. The pressing roller 72 is configured to press the heating roller 71.

In the image forming part 3, surfaces of the photosensitive drums 43 are uniformly charged by the chargers 44. Thereafter, laser light (dashed-dotted line) from the exposure unit 30 is irradiated to the surfaces of the photosensitive drums 43. As a result, electrostatic latent images are formed on the photosensitive drums 43. Also, the toner in the toner accommodation part is supplied to the developing rollers 46 through the supply rollers. Then, the toner is carried on the developing rollers 46.

The toner carried on the developing rollers 46 is supplied from the developing rollers 46 to the electrostatic latent images on the photosensitive drums 43. As a result, toner images are formed on the photosensitive drums 43. Thereafter, the sheet S fed onto the transfer belt 53 is conveyed between the photosensitive drums 43 and the transfer rollers 54. As a result, the toner images formed on the respective photosensitive drums 43 are transferred to the sheet S. Then, the sheet S is conveyed between the heating roller 71 and the pressing roller 72. As a result, the transferred toner images are heat-fixed on the sheet S.

The discharge unit 4 has a discharge path 81 formed to extend upward from an exit of the fixing unit 70 and to change a direction thereof toward the front, and a plurality of conveyor rollers 82 configured to convey the sheet S. The sheet S having the toner images heat-fixed thereon is enabled to pass the discharge path 81 by the conveyor rollers 82. Thereafter, the sheet S is discharged onto a discharge tray 12 located at an upper part of the apparatus main body 10, The apparatus main body 10 has an openable and closable front cover 11. The front cover 11 is a front sidewall of the apparatus main body 10. A user can open the front cover 11 and pull out the drum cartridges 41 to an outside of the apparatus main body 10. That is, the drum cartridge 40A is detachably mounted to the apparatus main body 10. Also, the user can pull out the transfer belt unit 50 to the outside of the apparatus main body 10 by demounting the drum cartridge 40A from the apparatus main body 10.

Subsequently, a detailed structure around the transfer belt unit 50 is described.

Figure 2:
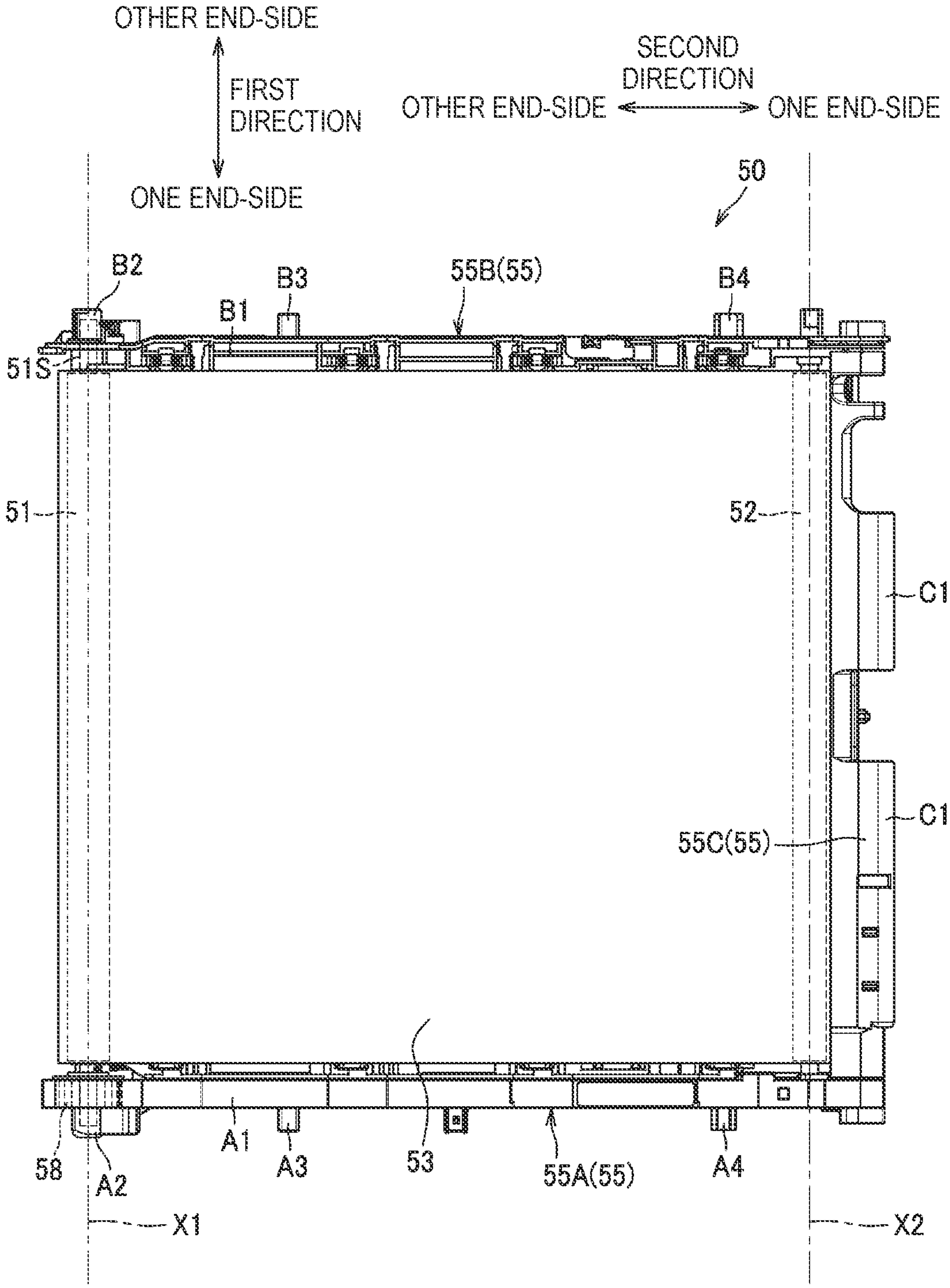
FIG. 2 is a plan view of a transfer belt unit.

As shown in FIG. 2, the transfer belt unit 50 has a belt frame 55. The belt frame 55 rotatably supports the drive roller 51 and the driven roller 52.

The drive roller 51 is rotatable about a first axis X1 extending in the first direction. The driven roller 52 is rotatable about a second axis X2 extending in the first direction. The driven roller 52 is located with being spaced from the drive roller 51 in the second direction intersecting with the first direction. In the exemplary embodiment, the second direction is a direction in which the first axis X1 and the second axis X2 are aligned, and intersects with the first direction.

The belt frame 55 has a first frame 55A, a second frame 55B, a third frame 55C, and a handle C1. The first frame 55A is located at an end portion of the transfer belt 53 at one end-side in the first direction. The second frame 55B is located at an end portion of the transfer belt 53 at the other end-side in the first direction. The third frame 55C is located at an end portion of the transfer belt 53 at one end-side in the second direction. The third frame 55C couples an end portion of the first frame 55A at the one end-side in the second direction and an end portion of the second frame 55B at the one end-side in the second direction.

The handle C1 is located on the third frame 55C. The handle C1 is located at an end portion of the belt frame 55 at the one end-side in the second direction. The user can mount and demount the transfer belt unit 50 by gripping the handle C1.

The first frame 55A has a main body part A1, a bearing part A2, an engaging part A3, and a supported part A4. The main body part A1 extends in the second direction. The bearing part A2, the engaging part A3 and the supported part A4 protrude from a side surface of the main body part A1 toward the one end-side in the first direction. The bearing part A2, the engaging part A3 and the supported part A4 protrude from the main body part A1 so as to be distant from the second frame 55B in the first direction.

The second frame 55B has a main body part B1, a bearing part B2, an engaging part B3, and a supported part B4. The main body part B1 extends in the second direction. The bearing part B2, the engaging part B3 and the supported part B4 protrude from a side surface of the main body part B1 toward the other end-side in the first direction. The bearing part B2, the engaging part B3 and the supported part B4 protrude from the main body part B1 so as to be distant from the first frame 55A in the first direction.

The bearing part A2 rotatably supports an end portion of a shaft 51S of the drive roller 51 at the one end-side in the first direction. The bearing part B2 rotatably supports an end portion of the shaft 51S of the drive roller 51 at the other end-side in the first direction. The bearing parts A2, B2 are cylindrical members. The bearing part A2 is located at an end portion of the first frame 55A at the other end-side in the second direction. The bearing part B2 is located at an end portion of the second frame 55B at the other end-side in the second direction. The drive roller 51 has a drive gear 58. The drive gear 58 is configured to transmit the drive force from the motor M of the image forming apparatus 1 to the drive roller 51. The drive gear 58 is located on the first frame 55A.

Figures 3A, 3B:
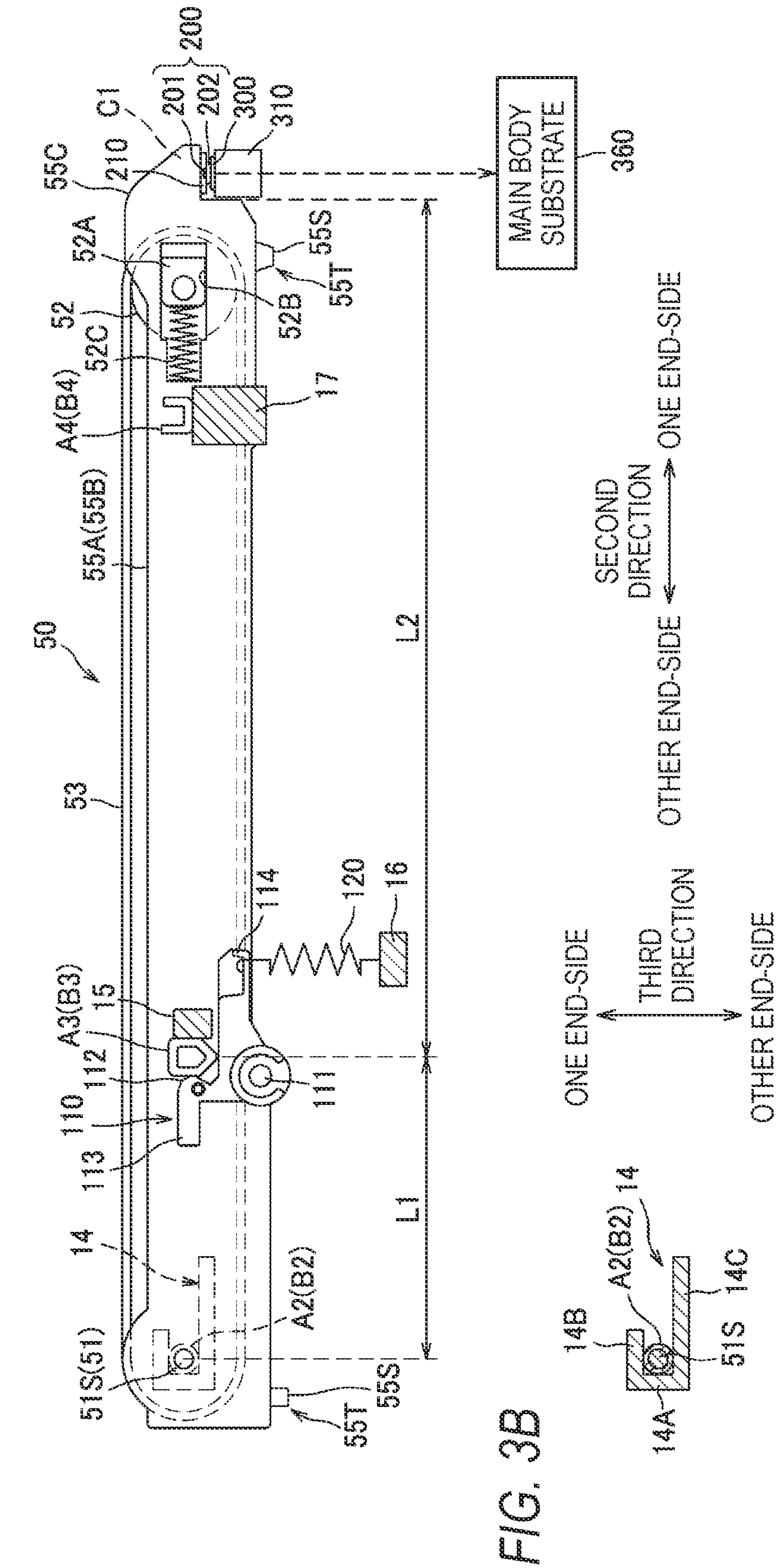
FIG. 3A is a side view depicting a simplified relation between the transfer belt unit located at a contact position and a pressing member.
FIG. 3B is a sectional view depicting a relation between a bearing part and a restraint part.

As shown in FIG. 3A, the bearing parts A2; B2 are supported by a restraint part 14 of the apparatus main body 10 in the state where the belt unit 50 is mounted to the apparatus main body 10. The restraint part 14 is a member configured to restrain a position of the drive roller 51 in the third direction intersecting with the first direction and the second direction via the bearing parts A2, B2. In the exemplary embodiment, the third direction is perpendicular to the first direction and the second direction.

As shown in FIG. 3B, the restraint part 14 has a bottom part 14A extending in the third direction, an upper part 14B extending from one end of the bottom part 14A in the third direction toward the one end-side in the second direction, and a lower part 14C extending from another end of the bottom part 14A in the third direction toward the one end-side in the second direction. The restraint part 14 has an opening at an end portion of the restraint part 14 at the one end-side in the second direction. The restraint part 14 has a U-shape. A length of the lower part 14C in the second direction is greater than a length of the upper part 14B in the second direction.

An interval between the upper part 14B and the lower part 14C is greater than an outer diameter of the bearing parts A2, B2. For this reason, in the state where the belt unit 50 is mounted to the apparatus main body 10, the bearing parts A2, B2 are inserted in the restraint part 14. Thereby, movement of the bearing parts A2, B2 in the third direction is restrained by the upper part 14B and the lower part 14C.

The bottom part 14A is configured to restrain a position of the drive roller 51 in the second direction. The bottom part 14A is in contact with the bearing parts A2, B2 in the state where the belt unit 50 is mounted to the apparatus main body 10. On the other hand, the bottom part 14A may be located while being spaced from the bearing part sA2, B2 in the second direction in the state where the belt unit 50 is mounted to the apparatus main body 10.

Also, the transfer belt unit 50 is rotatable about an axis of the drive roller 51 upon mounting to and demounting from the apparatus main body 10. Specifically, the transfer belt unit 50 is rotatable about the axis of the drive roller 51 between a contact position shown in FIG. 3A and a spaced position shown in FIG. 4.

As shown in FIG. 3A, the engaging parts A3, B3 are members engaged to a pressing member 110 of the apparatus main body 10. The engaging parts A3, B3 have a tapered shape. A distance between the engaging parts A3, B3 and the drive roller 51 in the second direction is a first distance L1. A distance between the engaging parts A3, B3 and the handle C1 in the second direction is a second distance L2 greater than the first distance L1. More specifically, a distance from the axis of the drive roller 51 to a contact points of the engaging parts A3, B3 and the pressing member 110 is the first distance L1. Also, a distance from the contact points of the engaging parts A3, B3 and the pressing member 110 to the other end of the handle C1 in the second direction is the second distance L2.

The pressing member 110 is a member configured to press the engaging part A3; B3 toward a positioning part 15 of the apparatus main body 10 in the second direction. The pressing member 110 is rotatable between an initial position shown in FIG. 4 and a pressing position shown in FIG. 3A. In the meantime, the positioning parts 15 are located at both sides of the transfer belt unit 50 in the first direction.

The pressing member 110 has a rotating shaft 111 rotatably supported by the apparatus main body 10, a first arm part 112 extending from the rotating shaft 111 toward one end-side in the third direction and configured to sandwich the engaging parts A3, B3 between the first arm part 112 and the positioning part 15, a guide part 113 protruding from an end portion of the first arm part 112 at one end-side in the third direction toward the other end-side in the second direction, and a second arm part 114 extending from the rotating shaft 111 toward the one end-side in the second direction. An end portion of the first arm part 112 at the one end-side in the third direction has a tapered shape.

The apparatus main body 10 has a tensile coil spring 120, a spring engaging part 16, and a support part 17.

One end portion of the tensile coil spring 120 is engaged to a tip end portion of the second arm part 114 of the pressing member 110. The other end portion of the tensile coil spring 120 is engaged to the spring engaging part 16. Thereby, the pressing member 110 is always pressed from the pressing position toward the initial position by the tensile coil spring 120. Also, the pressing member 110 pressed by the tensile coil spring 120 presses the engaging parts A3, B3 toward the positioning part 15 in the second direction. As a result, the transfer belt unit 50 is positioned in the second direction with respect to the apparatus main body 10. Here, when the engaging parts A3, B3 deviate from between the pressing member 110 and the positioning part 15, the pressing member 110 comes in contact with the positioning part 15. As a result, the pressing member 110 is kept at the initial position.

Also, the first frame 55A has the supported part A4, a bearing part 52A, a guide hole 52B, and a compression coil spring 52C. The second frame 55B has the supported part B4.

The supported parts A4, B4 are supported by the support part 17 in the state where the belt unit 50 is mounted to the apparatus main body 10. The supported part A4 is located between the engaging part A3 and the handle C1. The supported part B4 is located between the engaging part B3 and the handle C1. The bearing 52A rotatably supports the driven roller 52. The bearing 52A is located at an end portion of the first frame 55A at the one end-side in the second direction. The guide hole 52B is formed to movably support the bearing 52A in the second direction. The compression coil spring 52C is configured to urge the bearing 52A toward the one end-side in the second direction.

The transfer belt unit 50 includes a belt memory 200. The belt memory 200 is located on the belt frame 55. The belt memory 200 includes a memory element 201, and a first electrical contact surface 202. The first electrical contact surface 202 is electrically connected to the memory element 201. In the exemplary embodiment, the memory element 201 and the first electrical contact surface 202 are adjacent to each other. However, the memory element 201 and the first electrical contact surface 202 may be spaced apart.

In the belt memory 200, information about the transfer belt unit 50 is stored. Specifically, in the belt memory 200, a conveying speed of the transfer belt 53 measured in advance is stored. Also, in the belt memory 200, a thickness of the transfer belt 53, an outer diameter of the drive roller 51, and an outer diameter of the driven roller 52, which have been measured in advance, may be stored as examples of component information influencing the conveying speed of the belt.

Figure 5:
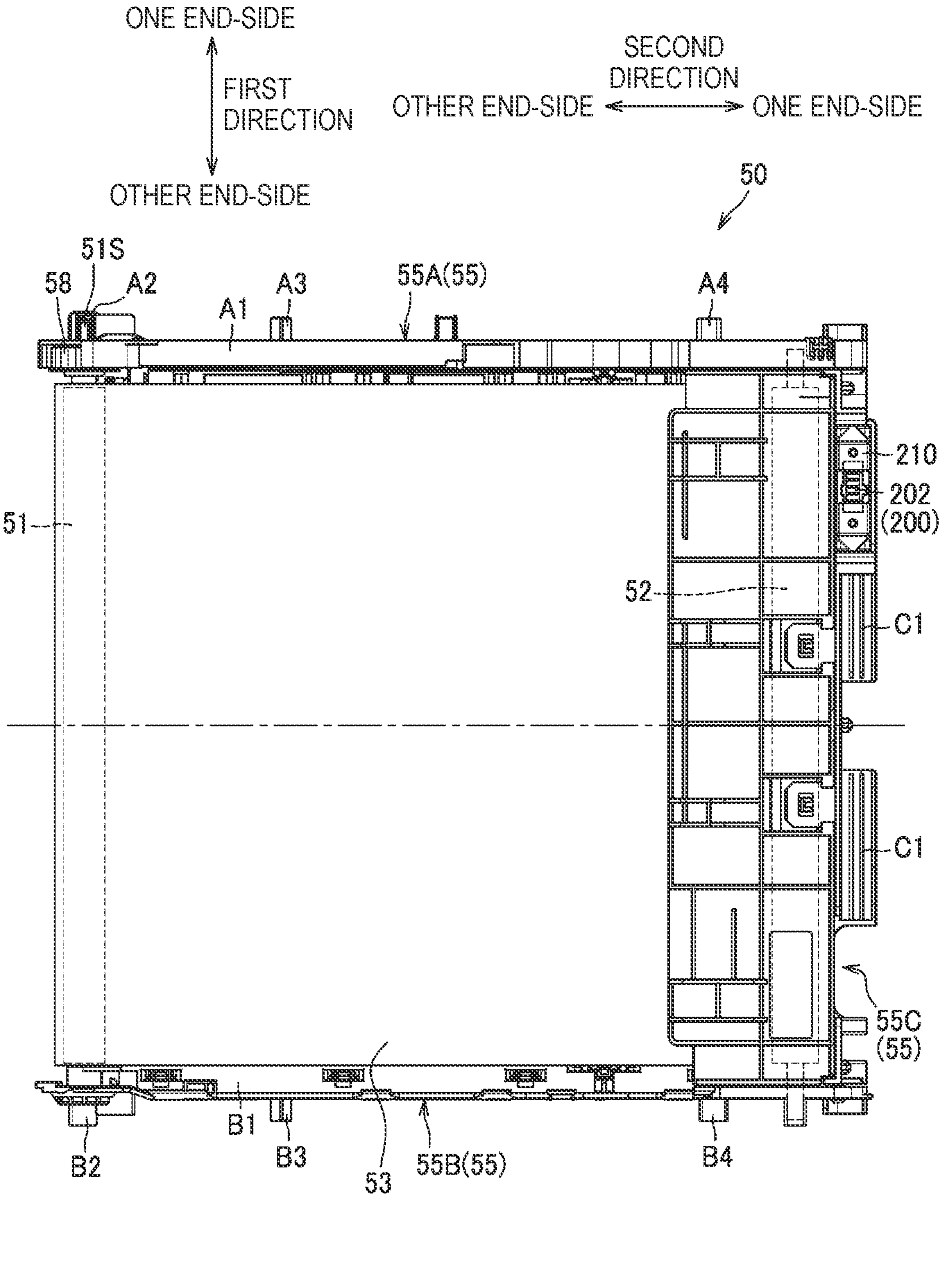
FIG. 5 depicts the transfer belt unit, as seen from below.

As shown in FIG. 5, the first electrical contact surface 202 is located on an outer surface of the belt frame 55. The first electrical contact surface 202 is located at the end portion of the belt frame 55 at the one end-side in the first direction. Also, the first electrical contact surface 202 is aligned with the handle C1 in the first direction, when viewed by a user from the third direction. The first electrical contact surface 202 is located at an end portion of the belt frame 55 at the one end-side in the second direction. The first electrical contact surface 202 is located at an opposite side to the drive roller 51 with respect to the driven roller 52 in the second direction. That is, the driven roller 52 is located between the first electrical contact surface 202 and the drive roller 51 in the second direction. The first electrical contact surface 202 is perpendicular to the third direction.

The belt frame 55 has a protrusion 55T, a holder 210, positioning parts 212, a spring holding part 213, and a spring 214.

As shown in FIG. 3A, the belt frame 55 has the protrusion 55T extending away from the transfer belt 53. The protrusion 55T extends in the third direction. The first electrical contact surface 202 is closer to the transfer belt 53 than to a tip end 55S of the protrusion 55T in the third direction.

Figure 6:
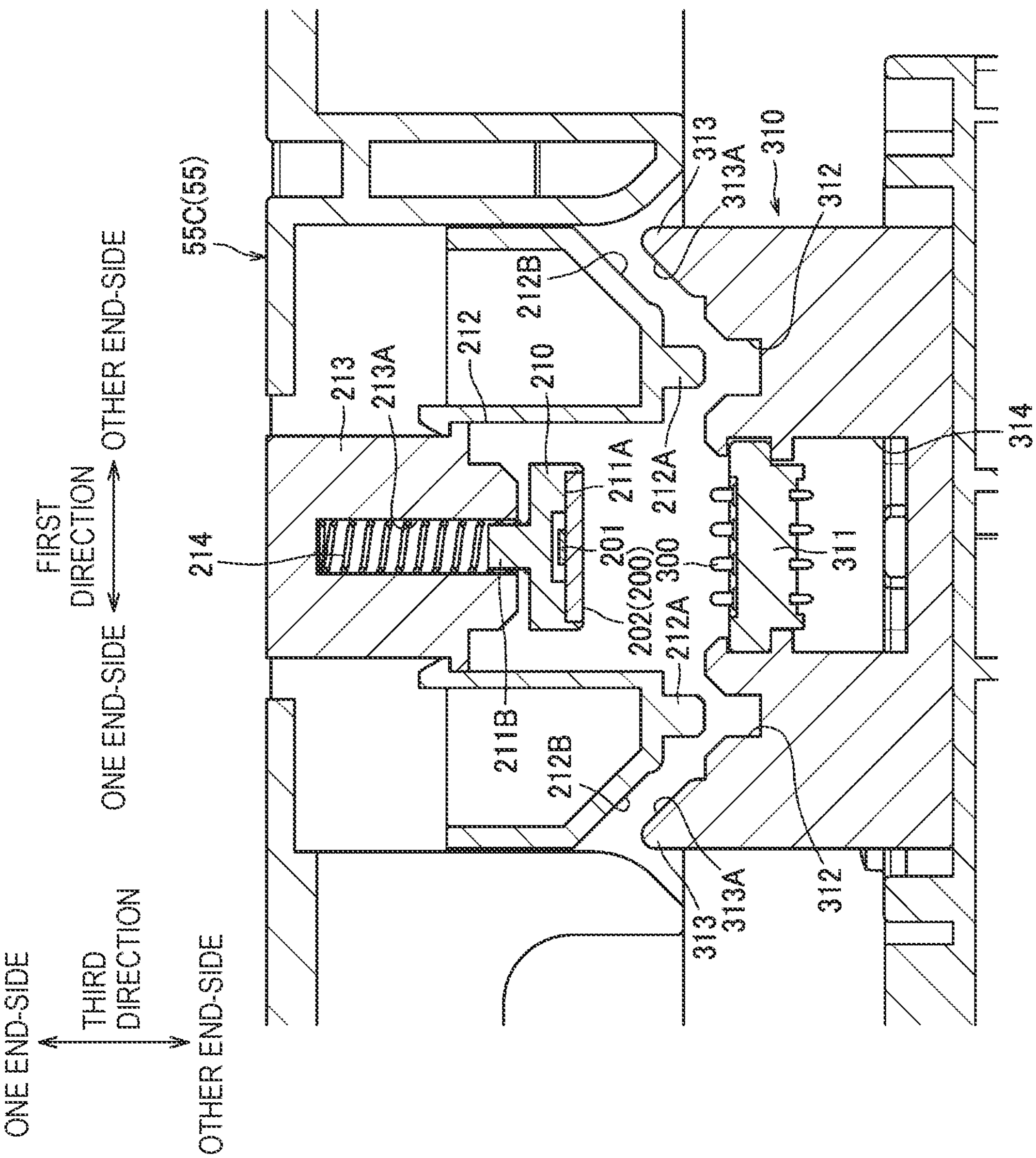
FIG. 6 is a sectional view of a holder and a contact holder.

As shown in FIG. 6, the holder 210 is supported by the spring holding part 213 so as to be slidable in the third direction. Specifically, the third frame 55C of the belt frame 55 has the holder 210 configured to hold the first electrical contact surface 202. The first electrical contact surface 202 of the belt memory 200 is held by the holder 210.

The holder 210 has a concave part 211A configured to hold the belt memory 200 and a protrusion 211B extending toward the one end-side in the third direction.

The spring holding part 213 has a hole 213A extending in the third direction. The spring 214 is located in the hole 213A. The spring 214 is a compression spring. One end of the spring 214 is in contact with a bottom of the hole 213A, and the other end of the spring 214 is engaged with the protrusion 211B of the holder 210. Thereby, the spring 214 always presses the first electrical contact surface 202 in the third direction.

The positioning parts 212 are located at both sides of the spring holding part 213 in the first direction.

The positioning part 212 is supported by the spring holding part 213 so as to be slidable in the third direction. The positioning part 212 has a positioning protrusion 212A protruding toward the other end-side in the third direction and an inclined surface 212B. The positioning protrusion 212A is located at an end portion of the spring holding part 213 in the first direction. The inclined surface 212B is located at a position more distant from the spring holding part 211 than the positioning protrusion 212A in the first direction. The inclined surface 212B is inclined so as to be more distant from the positioning protrusion 212A in the third direction as it is more spaced from the first electrical contact surface 202 in the first direction.

Figure 7:
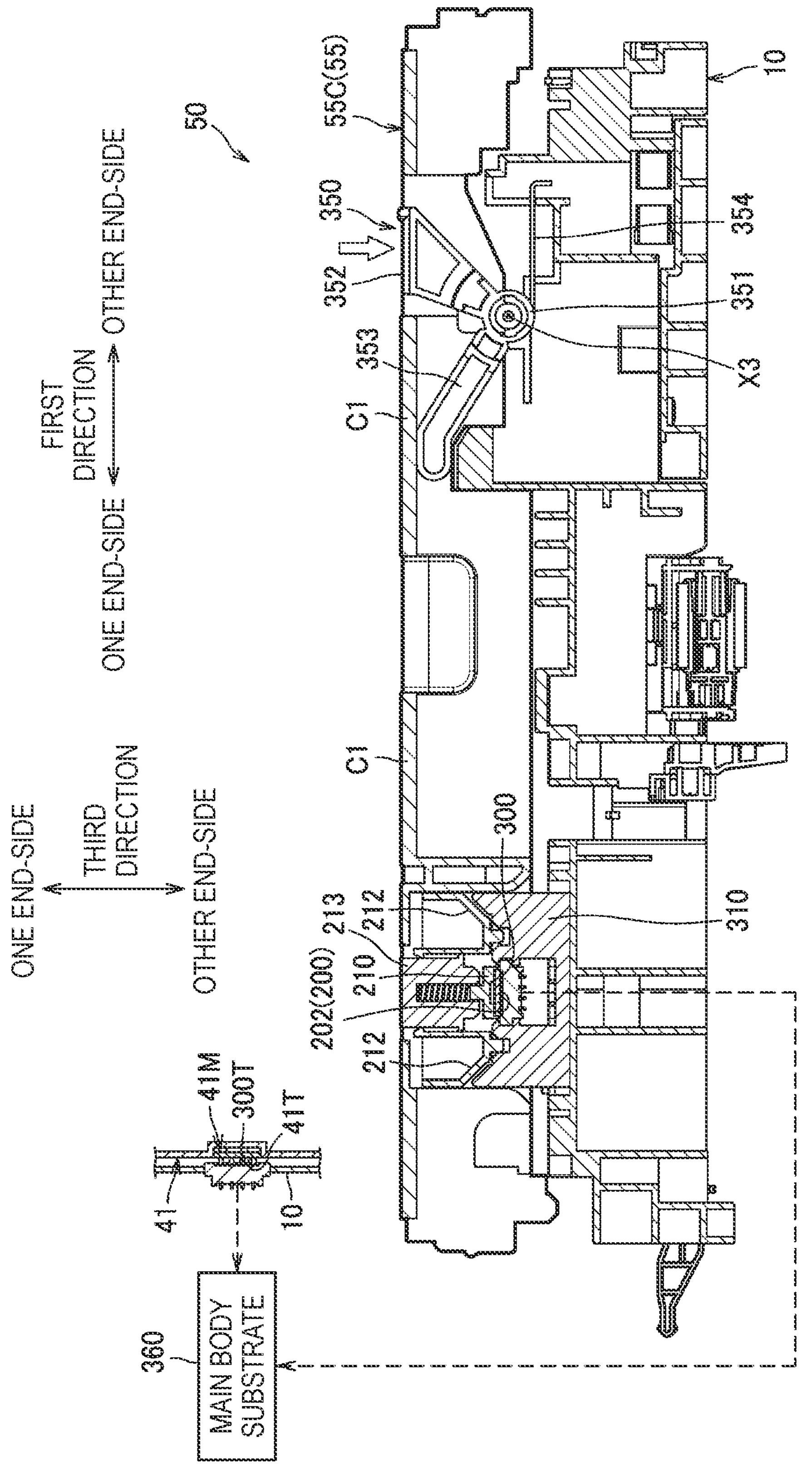
FIG. 7 depicts the transfer belt unit located at the contact position, as seen from a user side.
Figure 9:
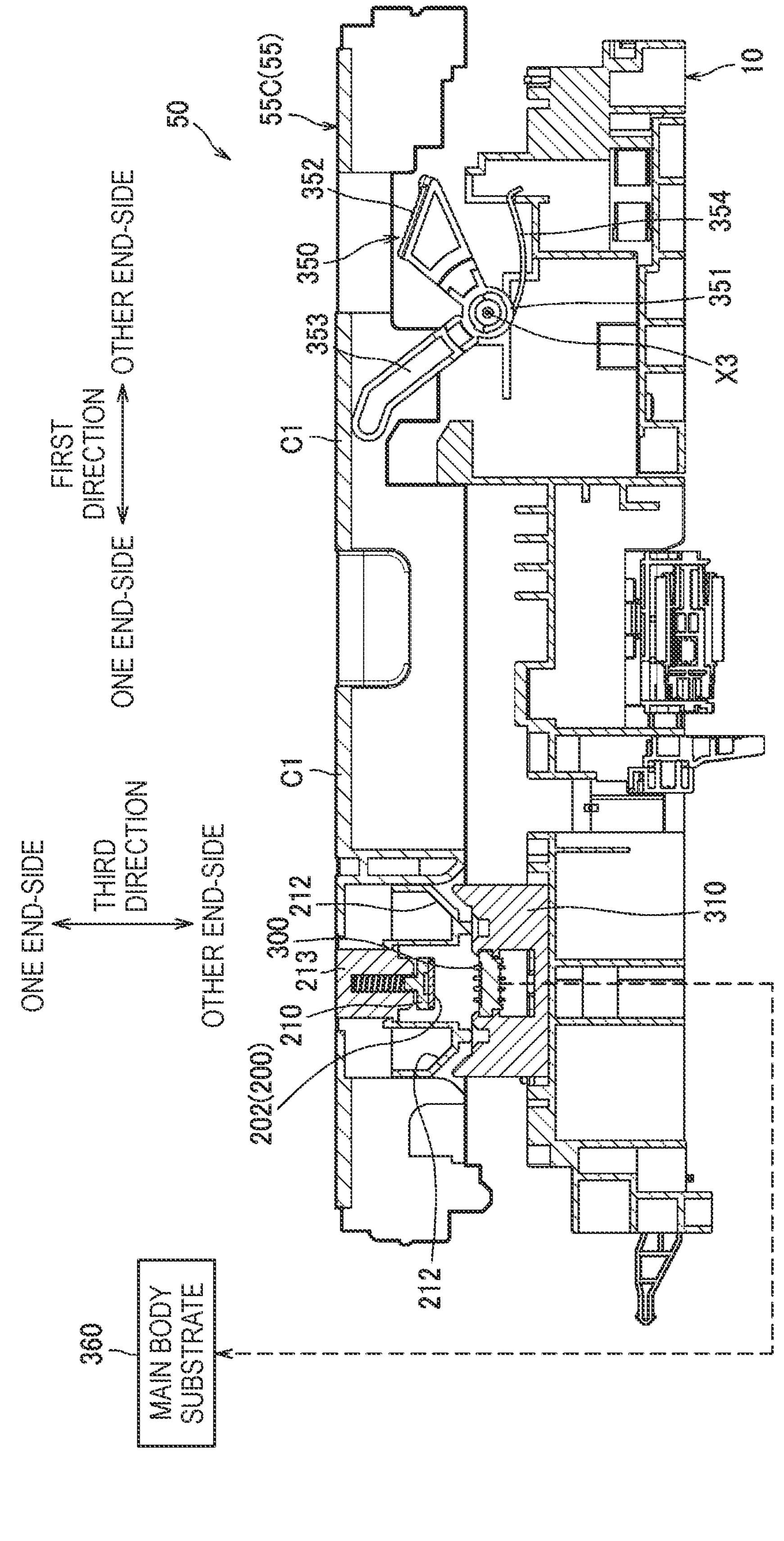
FIG. 9 depicts the transfer belt unit located at the spaced position, as seen from the user side.

The positioning parts 212 are located at both sides of the spring holding part 213 when the transfer belt unit 50 is located at the contact position shown in FIG. 7. On the other hand, when the transfer belt unit 50 is located at the spaced position shown in FIG. 9, the positioning parts 212 are slid by an urging member (not shown) or an own weight thereof, and is moved toward the other end-side in the third direction with respect to the spring holding part 213.

The image forming apparatus 1 includes a first electric contact 300, a contact holder 310, and a separation preventing member 320. As shown in FIG. 7, the first electric contact 300 is located at an end portion of the apparatus main body 10 at the one end-side in the first direction (refer to FIG. 9, too). The first electric contact 300 comes into electrical contact with the first electrical contact surface 202 in the state where the transfer belt unit 50 is mounted to the apparatus main body 10. The first electric contact 300 is held by the contact holder 310.

Figure 8:
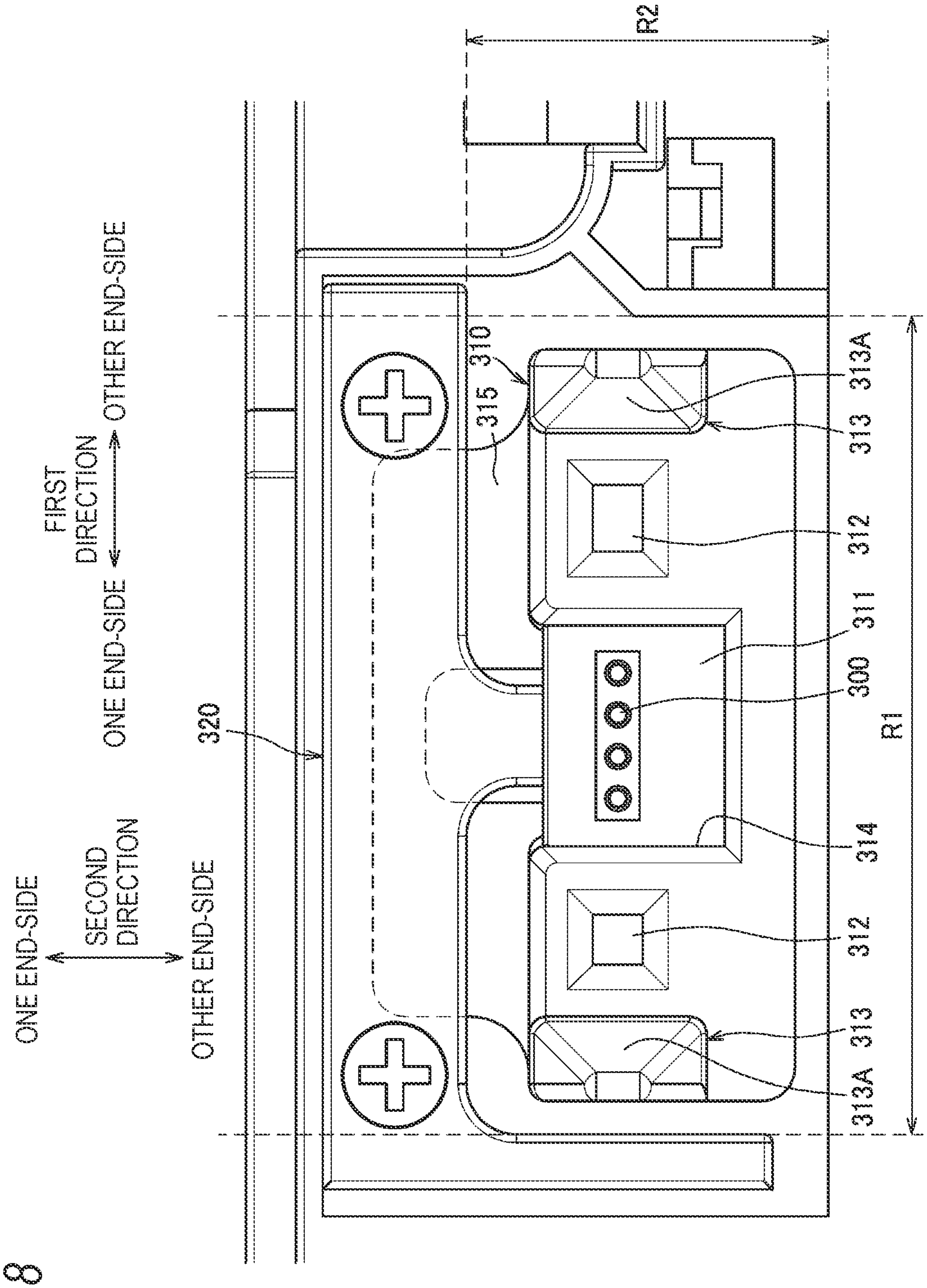
FIG. 8 depicts the contact holder, as seen from above.

As shown in FIG. 8, the contact holder 310 is held by the apparatus main body 10 and the separation preventing member 320. The apparatus main body 10 and the separation preventing member 320 hold the contact holder 310 so as to be slidable in the first direction and in the second direction. Specifically, the separation preventing member 320 holds the contact holder 310 so as to be slidable within a range of a region R1. The apparatus main body 10 and the separation preventing member 320 hold the contact holder 310 so as to be slidable within a range of a region R2. The separation preventing member 320 restrains the contact holder 310 from moving in the third direction. The contact holder 310 is capable of sliding in the first direction and the second direction.

The contact holder 310 has a holding member 311, holes 312, guides 313, a concave part 314, and an extension part 315. The holding member 311 is a member holding the first electric contact 300. The hole 312 is a hole that the positioning protrusion 212A of the holder 210 is to enter. The guide 313 has an inclined part 313A. The inclined part 313A is configured to come into contact with the inclined surface 212B of the holder 210, thereby guiding the holder 210. The concave part 314 supports the holding member 311. The extension part 315 extends toward the one end-side in the second direction. The extension part 315 is configured to enter between the apparatus main body 10 and the separation preventing member 320. Thereby, the contact holder 310 is restrained from moving in the third direction.

As shown in FIG. 7, the apparatus main body 10 has a lever 350. The lever 350 is rotatable about a rotary axis X3 extending in the second direction between a first position shown in FIG. 7 and a second position shown in FIG. 9. When the lever 350 is located at the first position, the first electrical contact surface 202 is in contact with the first electric contact 300. On the other hand, when the lever 350 is located at the second position, the first electrical contact surface 202 is spaced from the first electric contact 300.

The lever 350 has a rotating shaft 351, a first arm 352, a second arm 353, and a third arm 354.

The rotating shaft 351 is rotatable about the rotary axis X3. The first arm 352 extends from an outer peripheral surface of the rotating shaft 351. A tip end portion of the first arm 352 is aligned with the handle C1 in the first direction. The user can touch the tip end portion of the first arm 352.

The second arm 353 extends from the outer peripheral surface of the rotating shaft 351 in a direction different from the first arm 352. The second arm 353 is located while being spaced from the first arm 352 in a rotating direction of the lever 350. When the lever 350 is located at the first position, a tip end of the second arm 353 comes into contact with the handle C1.

The third arm 354 extends from the outer peripheral surface of the rotating shaft 351 in a direction different from the first arm 352 and the second arm 353. The third arm 354 can be elastically deformed. When the lever is located at the second position, a tip end of the third arm 354 is engaged with the apparatus main body 10. For this reason, when the lever is located at the second position, the third arm 354 always urges the lever 350 to return from the second position toward the first position.

In a state where the lever 350 is located at the first position, when the user presses the first arm 352 so that the lever 350 rotates from the first position to the second position, the second arm 353 pushes up the transfer belt unit 50 to the spaced position. Thereby, the first electrical contact surface 202 is spaced from the first electric contact 300. In other words, when the lever 350 is located at the first position, the first electrical contact surface 202 comes into contact with the first electric contact 300. When the lever 350 is located at the second position, the first electrical contact surface 202 is spaced from the first electric contact 300.

The apparatus main body 10 has a main body substrate 360 electrically connected to the first electric contact 300. The main body substrate 360 is located at the end portion of the apparatus main body 10 at the one end-side in the first direction. That is, both the first electric contact 300 and the main body substrate 360 are located at the end portion of the apparatus main body 10 at the one end-side in the first direction. The main body substrate 360 is a substrate including a CPU, a RAM, a ROM and an input/output circuit, for example.

As shown in FIG. 7, the drum cartridge 41 includes a drum memory 41M having a second electrical contact surface 41T (refer to FIG. 1, too). The apparatus main body 10 has a second electric contact 300T that is in contact with the second electrical contact surface 41T in the state where the drum cartridge 41 is mounted to the apparatus main body 10. The second electric contact 300T is located at the end portion of the apparatus main body 10 at the one end-side in the first direction. That is, both the second electric contact and the main body substrate 360 are located at the end portion of the apparatus main body 10 at the one end-side in the first direction.

Subsequently, operations that are performed when mounting and demounting the transfer belt unit 50 are described.

Figure 4:
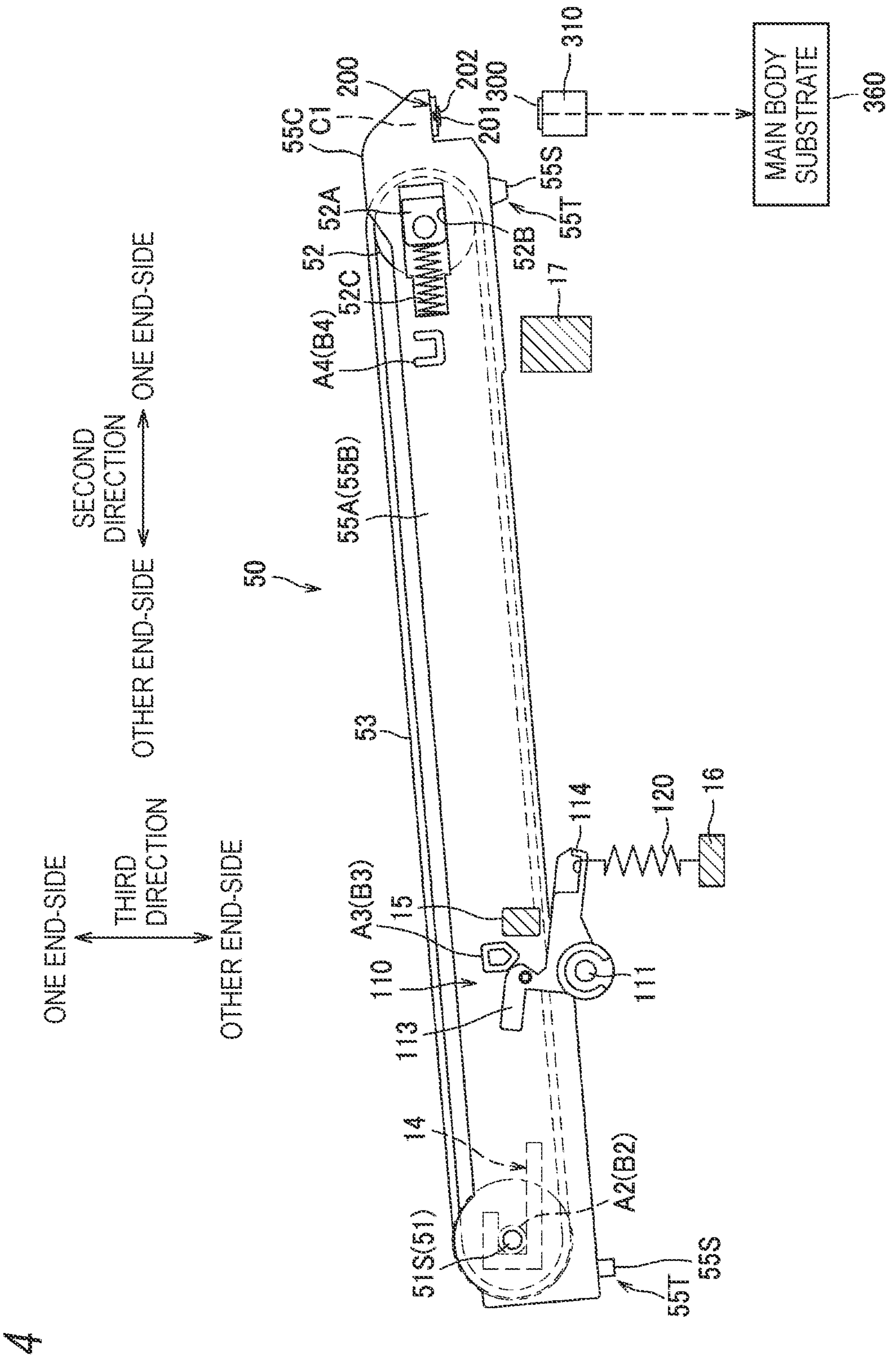
FIG. 4 is a view depicting a state where the transfer belt unit of FIG. 3A is located at a spaced position.

As shown in FIG. 4, when mounting the transfer belt unit 50 to the apparatus main body 10, the user first inserts the transfer belt unit 50 into the apparatus main body 10 while gripping the handle C1. At this time, the user inserts the bearing parts A2, B2 into the restraint parts 14.

Then, the user rotates the transfer belt unit 50 about the axis of the drive roller 51. Thereby, the engaging parts A3, B3 come into contact with the guide parts 113 of the pressing members 110. When the user further rotates the transfer belt unit 50, the engaging parts A3, B3 press the guide parts 113 of the pressing members 110 against the urging forces of the tensile coil springs 120. Thereby, the pressing members 110 are rotated from the initial position shown in FIG. 4 to the pressing position shown in FIG. 3A. At this time, the engaging parts A3, B3 enter between the pressing members 110 and the positioning parts 15. As a result, the transfer belt unit 50 is positioned in the second direction with respect to the apparatus main body 10. At this time, the first electrical contact surface 202 comes into contact with the first electric contact 300. When the first electrical contact surface 202 comes into contact with the first electric contact 300, the spring 214 presses the first electrical contact surface 202 in the third direction.

When the first electrical contact surface 202 comes into contact with the first electric contact 300, the positioning protrusions 212A of the holder 210 enter the holes 312 of the contact holder 310. As a result, the first electric contact 300 is positioned in the first direction and the second direction. In a case where the positioning protrusions 212A deviate from the holes 312 of the contact holder 310, the inclined parts 313A of the contact holder 310 are guided to the inclined surfaces 212B of the holder 210. For this reason, the positioning protrusions 212A are guided into the holes 312 of the contact holder 310.

When demounting the transfer belt unit 50 from the apparatus main body 10, the user first pushes the tip end portion of the first arm 352 of the lever 350 toward the other end-side in the third direction (an arrow direction in FIG. 7). Thereby, the tip end portion of the second arm 353 pushes up the handle C1 toward the one end-side in the third direction. Then, the transfer belt unit 50 is moved from the contact position to the spaced position (refer to FIG. 9). At this time, the user can grip the handle C1 by pushing fingers from a gap between the handle C1 and the apparatus main body 10. The user rotates the transfer belt unit 50 about the axis of the drive roller 51 by raising an end portion of the transfer belt unit 50 by gripping the handle C1. Thereby, the engaging parts A3, B3 depart from between the pressing members 110 and the positioning parts 15. For this reason, as shown in FIG. 4, the pressing members 110 are rotated in a clockwise direction by the urging forces of the tensile coil springs 120 and are thus returned from the pressing position to the initial position. Thereafter, the user separates the bearing parts A2, B2 from the restraint parts 14 and takes out the transfer belt unit 50 to the outside of the apparatus main body 10.

According to the transfer belt unit 50 as described above, it is possible to store the information about the transfer belt unit 50. Also, according to the image forming apparatus 1 including the transfer belt unit 50, it is possible to store the information about the transfer belt unit 50.

Also, since the first electrical contact surface 202 of the belt memory 200 is located at the outer surface of the belt frame 55, the information stored in the belt memory 200 can be easily read out from the first electrical contact surface 202.

Also, since the drive gear 58 and the first electrical contact surface 202 are arranged at the same side in the first direction, the positioning in the first direction can be performed easily.

Also, since the first electrical contact surface 202 is arranged at an opposite side to the drive roller 51 with respect to the driven roller 52 in the second direction, the first electrical contact surface 202 is unlikely to be an obstacle.

Also, since the first electrical contact surface 202 is aligned with the handle C1 in the first direction, it is possible to suppress enlargement of the transfer belt unit 50.

Also, since the holder 210 configured to hold the first electrical contact surface 202 can be slid in the third direction, the first electrical contact surface 202 can stably come into contact with a member configured to read out the information.

Also, since the first electrical contact surface 202 is urged in the third direction by the spring 214, it is possible to suppress contact defects which are caused due to vibrations and the like.

Also, the first electrical contact surface 202 is closer to the transfer belt 53 than to the tip end 55S of the protrusion 55T of the belt frame 55. Therefore, even when the transfer belt unit 50 is placed on a table or the like, the tip end 55S of the protrusion 55T comes into contact with the table, so that the first electrical contact surface 202 does not contact the table. For this reason, it is possible to suppress the first electrical contact surface 202 from being damaged.

Also, since the contact holder 310 can be slid in the first direction and the second direction, the first electrical contact surface 202 can stably contact the first electric contact 300.

The first electric contact 300, the second electric contact and the main body substrate 360 are located at the end portion at the one end-side in the first direction. For this reason, it is possible to shorten a wiring that connects the first electric contact 300 and the second electric contact to the main body substrate 360.

Also, the first electrical contact surface 202 is in contact with the first electric contact 300 when the lever 350 is located at the first position, and the first electrical contact surface 202 is spaced from the first electric contact 300 when the lever 350 is located at the second position. Therefore, it is possible to easily demount the transfer belt unit 50 by locating the lever 350 at the second position.

In the above configuration, the lever 350 can rotate about the rotary axis X3 extending in the second direction intersecting with the first direction. For this reason, it is possible to compactly arrange the lever 350 in the second direction. As a result, the lever 350 is unlikely to be an obstacle.

Also, the user can push up the transfer belt unit 50 by pushing the first arm 352 of the lever 350. For this reason, the user can easily demount the transfer belt unit 50.

Although the exemplary embodiment of the present disclosure has been described, the present disclosure is not limited to the exemplary embodiment.

In the exemplary embodiment, the transfer belt unit has the drive roller and one driven roller. However, the present disclosure is not limited thereto. For example, the transfer belt unit may have the drive roller and two or more driven rollers.

In the exemplary embodiment, the image forming apparatus 1 is the color laser printer. However, the present disclosure is not limited thereto. For example, the present disclosure can be applied to other image forming apparatuses such as a copier, a complex machine, and the like.

What is claimed is:

1. A transfer belt unit comprising:

a transfer roller rotatable about a first axis extending in a first direction;

a transfer belt being in contact with a photosensitive drum in a state where the transfer belt unit is mounted to the apparatus main body, the transfer belt having a first end and a second end spaced apart from the first end in the first direction; and a belt memory including:

a memory element in which information about the transfer belt unit is stored; and a first electrical contact surface electrically connected to the memory element, the first electrical contact surface being positioned between the first end of the transfer belt and the second end of the transfer belt in the first direction, wherein the transfer belt is an endless belt, the transfer roller is positioned inside of the transfer belt, and the first electrical contact surface is positioned outside of the transfer belt.

2. The transfer belt unit according to claim 1, further comprising:

a holder holding the first electrical contact surface, the holder including a protrusion extending from an outer surface of the holder in a second direction intersecting with the first direction.

3. The transfer belt unit according to claim 1, further comprising:

a backup roller rotatable about a second axis extending in the first direction, the backup roller being in contact with an inner surface of the transfer belt.

4. The transfer belt unit according to claim 1, further comprising:

a drive roller configured to drive the transfer belt, the drive roller being rotatable about a drive axis extending in the first direction, and the drive roller being in contact with an inner surface of the transfer belt; and a driven roller being rotatable in association with driving of the transfer belt, the driven roller being rotatable about a driven axis extending in the first direction, the driven roller being in contact with the inner surface of the transfer belt, and the driven roller being spaced from the drive roller in a third direction intersecting with the first direction.

5. The transfer belt unit according to claim 4, wherein the first electrical contact surface is positioned closer to the driven roller than to the drive roller in the third direction.

6. The transfer belt unit according to claim 4, wherein the driven roller is positioned between the first electrical contact surface and the drive roller in the third direction.

7. The transfer belt unit according to claim 4, wherein the drive roller includes a drive gear configured to transmit a drive force to the drive roller, and wherein the drive gear and the first electrical contact surface are positioned at one end of the transfer belt unit in the first direction.

8. The transfer belt unit according to claim 4, wherein the belt memory stores information about a thickness of the transfer belt, an outer diameter of the drive roller, and an outer diameter of the driven roller.

9. The transfer belt unit according to claim 1, wherein the belt memory stores information about a conveying speed of the transfer belt.

10. The transfer belt unit according to claim 1, further comprising:

a belt electrode electrically connected to the transfer belt via the transfer roller.

11. The transfer belt unit according to claim 10, wherein the first electrical contact surface is positioned at one end of the transfer belt unit in the first direction, and wherein the belt electrode is positioned at the other end of the transfer belt unit in the first direction.

12. The transfer belt unit according to claim 1, further comprising:

a belt frame including a frame protrusion protruding in a second direction intersecting with the first direction, wherein the first electrical contact surface is positioned between a tip end of the frame protrusion and the memory element in the second direction.

13. The transfer belt unit according to claim 12, wherein the belt frame includes a handle located at an end portion of the belt frame at one end side in the second direction, and wherein the first electrical contact surface is aligned with the handle in the first direction when viewed from a third direction intersecting the first direction and the second direction.

14. The transfer belt unit according to claim 12, wherein the belt frame includes a holder holding the first electrical contact surface, and wherein the holder is slidable in a third direction intersecting with the first direction and the second direction.

15. The transfer belt unit according to claim 14, wherein the belt frame further includes a spring configured to press the first electrical contact surface in the third direction.

16. The transfer belt unit according to claim 14, wherein the third direction is a direction perpendicular to the first electrical contact surface.

* * * * *